H. B. SMITH.
Side-Hill Plow.
No. 46,716.　　　　　　　　　　　　　Patented Mar. 7, 1865.
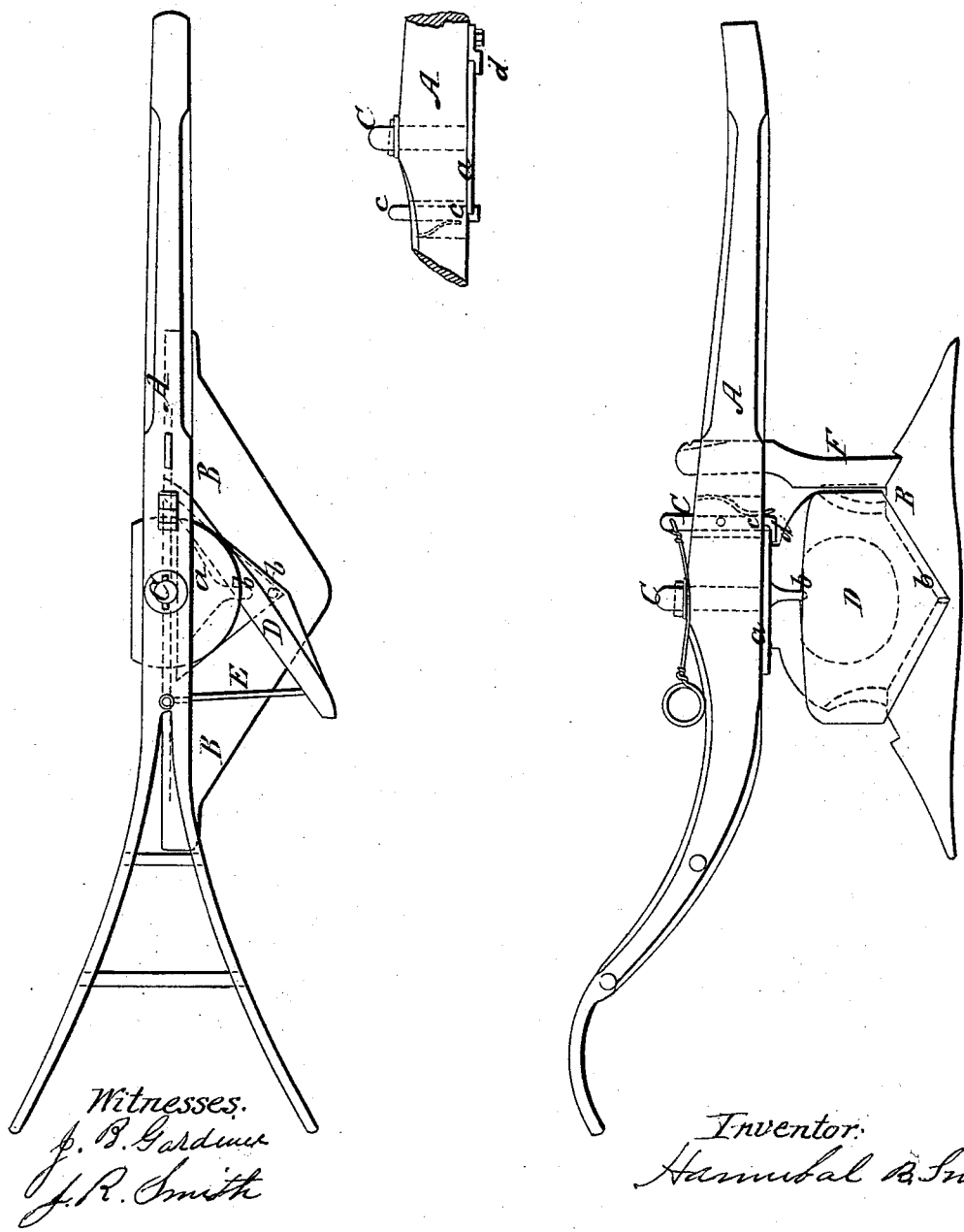
Witnesses:　　　　　　　　　　　　　Inventor:

UNITED STATES PATENT OFFICE.

HANNIBAL B. SMITH, OF SPRINGFIELD, MASSACHUSETTS.

IMPROVED SIDE-HILL PLOW.

Specification forming part of Letters Patent No. 46,716, dated March 7, 1865.

*To all whom it may concern:*

Be it known that I, HANNIBAL B. SMITH, of Springfield, Hampden county, State of Massachusetts, have invented a new and Improved Plow; and I do hereby declare that the following is a full and exact description, reference being had to the accompanying drawings, and to letters of reference marked thereon.

Everyone acquainted with the use of the plow understands the need of some improvement by which when the plow has reached the end of the furrow it may be so arranged as to return on the same side of the field, thus avoiding the necessity of going a long distance to commence a new furrow, and also doing away with what are technically called "dead-furrows," which will be immediately recognized as an important advantage, for the present advanced state of machinery used in the cultivation of land—such as mowing and reaping machines, horse-rakes, &c.—requires that the land should be left as smooth as possible. Now, in the ordinary method of plowing a dead-furrow—which consists of a double furrow with the land turned out each side, forming a hollow through the field—had to be made at intervals of two or three rods, causing an unevenness in the surface very disagreeable in the after cultivation. Several plows of this kind have been invented, called "side-hill" plows, which operate very well where the land descends so that they can be turned by their own weight, but are almost useless on level land.

The object of my invention is to accomplish this in a simple and economical manner without adding materially to the weight or cost of the plow.

My invention may be described as follows: A is the beam of the plow, made in one piece, of peculiar form, divided at the rear end to form handles.

B is the plowshare, having a point at each end, attached to the beam by means of the pivot C, and moving thereon. It is provided with a flange, $a$, upon which the beam revolves.

D is the mold-board, turning on the pivots $b$ $b$, and secured, when in place, by the colter F or the brace E, which can be moved from side to side. In the flange $a$ are notches, cut on opposite sides, to receive the spring-catch $c$, which is also provided with a lip, $d$, which extends under the flange $a$ and steadies the share when in the furrow. In Figure 2 the spring-catch $c$ is shown front of the flange $a$; but it may be placed behind it, as in Fig. 3, in which case the lip $d$ will remain in front attached to the beam. The bottom line of the share B is formed lowest in the center, as shown in the drawings, so that the rear end may be raised and not lie along the furrow.

The operation is as follows: When the plow arrives at the end of the furrow the spring-catch $c$ is pulled out from the notch in the flange $a$, leaving the beam free to revolve on the pivot C. The team is then driven round, and as the plow turns the colter F strikes the mold-board D and turns it as the beam rotates until the catch $c$ springs into the opposite notch from the starting, when the plow is ready to return. The brace E may now be moved to the other side or not, at the option of the plowman.

If necessary, the parts can be arranged so as to move in either direction.

Now, having described my invention, what I claim as new, and desire to secure by Letters Patent, is—

The combination of the movable mold-board D with the share B, flange $a$, beam A, spring-catch $c$, and lip $d$, or their equivalents, operating substantially as described.

HANNIBAL B. SMITH.

Witnesses:
J. B. GARDINER,
J. R. SMITH.